United States Patent [19]

Zeiss et al.

[11] Patent Number: 4,985,276
[45] Date of Patent: Jan. 15, 1991

[54] PROCESS FOR HARDENING BALLASTS AND OTHER HEAPED STRUCTURES

[75] Inventors: Karl R. Zeiss, Freiburg; Paul Degen, Buhlertal, both of Fed. Rep. of Germany

[73] Assignee: Messer Griesheim, Fed. Rep. of Germany

[21] Appl. No.: 456,523

[22] Filed: Dec. 23, 1989

[51] Int. Cl.$^5$ .............................................. B05D 3/04
[52] U.S. Cl. .................................... 427/136; 427/203; 427/204; 427/374.1; 427/407.1; 238/2
[58] Field of Search ............ 427/136, 203, 204, 374.1, 427/302, 402.1; 238/2

[56] References Cited

U.S. PATENT DOCUMENTS

| | | | |
|---|---|---|---|
| 4,156,440 | 5/1979 | Katoh et al. | 238/2 |
| 4,360,608 | 11/1982 | Hijikata et al. | 523/450 |
| 4,451,180 | 5/1984 | Duval | 238/2 |

*Primary Examiner*—Shrive Beck
*Assistant Examiner*—Benjamin L. Utech
*Attorney, Agent, or Firm*—Connolly & Hutz

[57] ABSTRACT

The process for hardening ballasts and other heaped structures calls for an adhesive, which is pourable at ambient temperatures, to first be transformed into the solid state by means of cooling. Then, the application of the liquid adhesive onto the heaped structure is time-dosed by the thawing of the cooled adhesive.

8 Claims, 1 Drawing Sheet

PROCESS FOR HARDENING BALLASTS AND OTHER HEAPED STRUCTURES

BACKGROUND OF THE INVENTION

The invention relates to a process for hardening ballasts and other heaped structures in situ by means of an adhesive that is pourable at the ambient temperature.

Such a process can be used advantageously wherever ballasting and porous or open-cell heaped structures which are in a loose form or which have already been partially hardened, for example, by means of vibration or stamping operations are to be vertically bonded over a certain height, whereby the pourable adhesive used for this purpose penetrates from the surface of the material down to a certain depth, before it then solidifies and bonds. A particularly important application is the hardening of ballasts used for railroad track systems, which, among other things, serve as sound absorbers and which are at risk due to the high speeds reached by modern trains. The process can also be employed, for instance, to harden construction foundations, emergency roads and auxiliary air strips.

If a high-viscosity adhesive is poured onto such heaped structures, the adhesive cannot penetrate deep enough and it seals the outer pores, thus severely impairing the sound-absorbing and drainage properties of the material. If, however, a low-viscosity adhesive is used, it flows very quickly, not only downwards but also sideways, so that a large amount of it never reaches the area to be hardened. On the other hand, the use of low-viscosity adhesives has the advantage that the adhesive penetrates even into very small pores and narrow gaps, thus ensuring that the pieces of the heaped structure adhere to each other on many contact points.

Even if one were to assume that it is possible to produce an adhesive with a very precise degree of viscosity, which is suitable for bonding the pieces of a certain heaped structure down to a certain depth, there are still other problems to be solved, namely that, over the application time, the viscosity curve usually changes as the adhesive hardens and that, in particular, uniform conditions do not exist under actual circumstances, since the material, the porosity, the temperature and other parameters are subject to fluctuations which have a great influence on the quality of the hardening whenever an adhesive of uniform viscosity is poured or sprayed in its liquid state onto the heaped structure.

SUMMARY OF THE INVENTION

Therefore, the invention is based on the objective of providing a process which makes it possible, in a better way than could be done up until now, to vertically harden heaped structures with as little binder as possible down to a prespecified depth.

This task is solved according to the invention in that the adhesive is first transformed into the solid state by means of cooling and in that the application of the liquid adhesive onto the heaped structure is time-dosed by the thawing of the cooled adhesive.

This invention provides the advantage that it is now easier to control the slow seepage of the adhesive into the heaped structure with respect to both time and space distribution than was the case with a pouring procedure carried out all at once. Moreover, the slow seepage itself is less susceptible to fluctuations in the material and in the operating conditions than the pouring or spraying procedures which have been in use so far. In order to achieve certain desired results of the work, it is possible to more precisely measure the amount of the expensive adhesive to be used and, as will be explained in greater detail below, to also substantially reduce the amount of adhesive necessary as a result of the physical occurrences that take place during the seepage. As a result, despite the fact that the pieces of the heaped structure adhere to each other, the porosity of the heaped structure remains virtually unchanged since, in most cases, the aimed-at hardening effect is already achieved with an amount of adhesive which lies at approximately 1 to 50 per thousand of the weight of the pieces of the heaped structure bonded by this adhesive. Often, a mere amount of 5 to 10 per thousand is already sufficient.

Basically, all of the adhesives that are already employed for this same purpose can be used with this process. Usually, these are reaction plastics on the basis of, for example, epoxy resins, methacrylates, polyurethane, silicone resins or other plastics whose resin-hardener mixture can be adjusted in a known manner in order to achieve a certain viscosity, potlife and certain other final properties for the process according to the invention and the particular application case.

Beside adhesives on the basis of synthetic resins, it is also possible to optionally use tar or a bituminous compound as the adhesive, whereby this embodiment shows that, when the ambient temperature is mentioned, as was done above, this does not necessarily mean the temperature of the surrounding atmosphere, but rather it could also refer to a higher or lower temperature generated artificially at which the adhesive being used in that particular case has the desired viscosity that it needs to penetrate into the pores of the heaped structure down to a sufficient depth. The pourability of tar or bitumen after thawing can be promoted, for example, by means of heating the upper layers of the heaped structure before and/or after the binder has been applied, and then the bituminous adhesive also hardens as a result of the cooling process.

In a preferred embodiment of the process according to the invention, the adhesive is applied in the form of powder, granules or small pieces onto the heaped structure so that it can then slowly thaw there. The adhesive can be easily transformed into the solid state by allowing a cryogenic liquefied gas such as, for instance, liquid nitrogen to flow through the adhesive while it is in the liquid state. This chilling procedure concurrently gives rise to granulation. Another possibility is to cool the adhesive in the form of large blocks and then to smash or grind these blocks into smaller pieces. The frozen pieces or the adhesive granulate can be stored cooled, so that during application they can be poured onto the top of the heaped structure to be hardened, a process in which the thickness of the layer of adhesive depends on the desired seeping depth to be achieved.

In order to prolong the thawing process of the adhesive, another preferred embodiment of the process according to the invention calls for the adhesive to be covered with an insulating layer or a cooling layer consisting, for example, of frozen carbon dioxide in the form of small pieces or of granules. The cooling protection layer prevents the top of the adhesive layer from thawing too fast or from running off to the side as a result of the effect of heat. Also for purposes of retarding thawing, another embodiment of the invention provides that at least the surface area of the heaped structure be cooled by means of a liquid or gaseous cooling fluid prior to application of the adhesive.

After the solid adhesive has been applied onto the heaped structure, it slowly starts to thaw as a result of the difference in temperature. Depending on the viscosity of the liquified adhesive and on the rate of thawing, a migration-flow speed develops which is, in any case, much slower than the migration-flow speed which occurs when the same amount of adhesive is poured onto the heaped structure all at once. In view of the fact that at a certain viscosity and with a certain flow pattern, the flow resistance is a function of the square of the flow speed, as a consequence of the slower seeping speed that is achieved according to the invention, there is substantially less flow resistance as the adhesive seeps into the heaped structure in the vertical direction; this has the additional consequence that the liquid adhesive, which is slowing seeping downwards, does not run off to the sides, as is the case when liquid adhesive is poured onto heaped structures due to the high flow rate and the accompanying high flow resistance in the vertical direction.

Since, with the process according to the invention, just about all kinds of adhesive—regardless of their viscosity —only seep into the heaped structure relatively slowly as a result of the controllable thawing speed, it is possible to preferably use relatively fluid or low-viscosity adhesives. While these types of adhesive seep into the hollow spaces of the heaped structures, they are also subject to the capillary effect, which pulls them especially into the small pores and narrow gaps, particularly towards the contact points of the ballast stones or of other heaped pieces. In particular, this is an effect which the process according to the invention aims at achieving, since the purpose of the invention is to bond the heaped pieces to each other at their points of contact, if possible, without filling up the inner hollow spaces in the heaped structure, so as not to interfere with its properties, and also in order to save adhesive.

THE DRAWINGS

FIG. 1 shows a heaped structure with a layer of solid adhesive applied onto it; and FIG. 2 shows the seepage of the thawed adhesive into the heaped structure.

DETAILED DESCRIPTION

Figure 1:
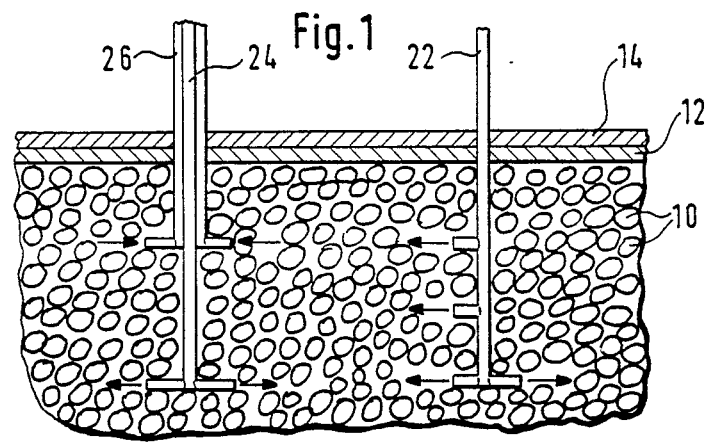

The heaped structure is designated as 10, the applied layer of solid adhesive as 12 and a cooling protection layer over it is designated as 14. According to FIG. 2, a grain or piece of solid, frozen adhesive designated as 16 slowly thaws, consecutively releasing drops 18, which flow almost without any deviations around the ballast stones or other heaped pieces designated as 20 and seep into the heaped structure rather precisely in the vertical direction, a process in which these drops wet the contact points of the ballast stones 20 as a result of the capillary effect. This process takes place slowly since, as can be clearly seen in FIG. 2, a thawed drop 18 is first held on a point of contact of the top ballast stone 20 as a consequence of the capillary effect. Only after additional thawing of the solid adhesive piece 16 has released another drop are the capillary forces no longer able to hold back the now larger volume of liquid adhesive on the top ballast stone 20, so that a drop is released from this place, which then seeps further down until it is once again halted by the capillary forces at a lower contact point between the ballast stones 20. This process is repeated until all of the adhesive has thawed, whereby the amount of adhesive for a certain heaped structure determines the number of contact points which lie vertically below each other and which adhere to one another, thus also determining the seeping depth.

Figure 2:
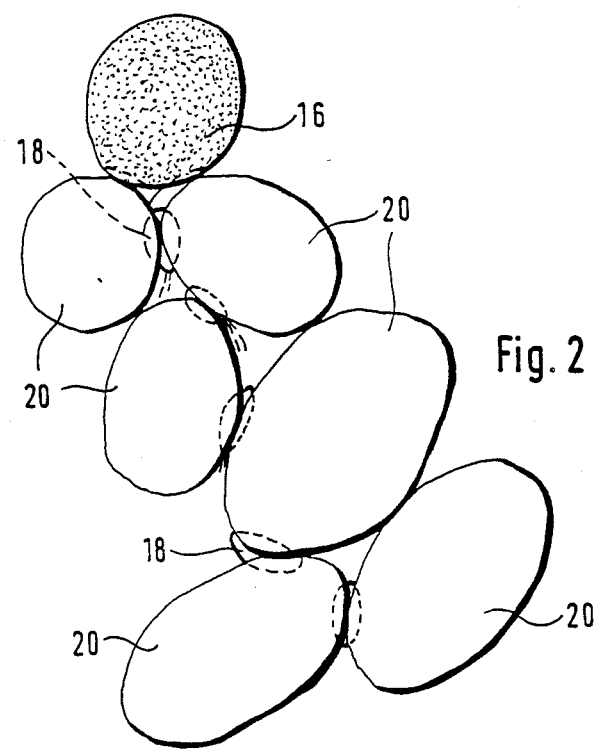

FIG. 2 also makes it clear that even extremely low-viscosity adhesives are applied one drop at a time, that is, at a low flow rate, something which combines optimum seeping behavior and the best possible utilization of the capillary activity.

In certain cases, it can be advantageous to additionally influence the slow flowing movements of the liquid adhesive within the hollow spaces of the heaped structure by means of a gas flow, whereby it is possible to influence the seeping adhesive by means of the temperature and of the gas flow rate in conjunction with its flow direction. For this purpose, as an example, FIG. 1 shows pipes 22, 24 and 26, which are inserted into the heaped structure and which have a number of air inlet and/or outlet openings, so that, depending on the application purpose, for example, hot or cold air can be pumped into or sucked out of the hollow spaces of the heaped structure, and this air can be optionally fed in the opposite direction of the flow of the liquid adhesive in the area through where the latter is seeping, in order to further retard this seepage, or else the air flows in the same direction in order to facilitate seeping down to even lower depths or, finally, it is meant to promote or to prevent that the adhesive runs off to the side. At the same time, with the gas flow, it is possible to elevate the ambient temperature of, for example, a bituminous adhesive, or else the temperature of a plastic adhesive can be kept at a low ambient temperature in order to retard the hardening process.

Fundamentally, the process according to the invention makes it possible to harden ballasts and other heaped structures down to a depth of approximately 15 cm without substantially impairing the porosity.

What is claimed is:

1. In a process for hardening ballasts and heaped structures by means of an adhesive which is pourable at the ambient temperature, the improvement being in that the adhesive is first transformed into the solid state by means of cooling, and the solid adhesive is applied onto the heaped structure and time-dosed by the thawing of the cooled adhesive.

2. Process according to claim 1, characterized in that the adhesive is applied in the form of powder, granules or small pieces onto the heaped structure.

3. Process according to claim 2, characterized in that the thawing of the adhesive is prolonged in that the adhesive is covered with an insulating layer or a cooling layer.

4. Process according to claim 3, characterized in that at least the surface area of the heaped structure is cooled by means of a liquid or gaseous cooling fluid prior to application of the adhesive.

5. Process according to claim 4, characterized in that during thawing and seepage of the adhesive into the heaped structure, a gas flow is generated in the heaped structure.

6. Process according to claim 1, characterized in that the thawing of the adhesive is prolonged in that the adhesive is covered with an insulating layer or a cooling layer.

7. Process according to claim 1, characterized in that at least the surface area of the heaped structure is cooled by means of a liquid or gaseous cooling fluid prior to application of the adhesive.

8. Process according to claim 1, characterized in that during thawing and seepage of the adhesive into the heaped structure, a gas flow is generated in the heaped structure.

* * * * *